United States Patent
Downs et al.

(10) Patent No.: US 12,138,613 B2
(45) Date of Patent: Nov. 12, 2024

(54) OXIDE-BASED DOPING OF EVAPORABLE GETTER

(71) Applicant: Honeywell International Inc., Charlotte, NC (US)

(72) Inventors: John Downs, Morristown, NJ (US); Mahdi Mohajeri, Morristown, NJ (US); Dean Eivind Johnson, Orono, MN (US)

(73) Assignee: Honeywell International Inc., Charlotte, NC (US)

( * ) Notice: Subject to any disclaimer, the term of this patent is extended or adjusted under 35 U.S.C. 154(b) by 74 days.

(21) Appl. No.: 17/935,878

(22) Filed: Sep. 27, 2022

(65) Prior Publication Data
US 2024/0100499 A1    Mar. 28, 2024

(51) Int. Cl.
| G01C 19/00 | (2013.01) |
| B01J 20/02 | (2006.01) |
| B01J 20/04 | (2006.01) |
| G01C 19/64 | (2006.01) |
| G01C 19/66 | (2006.01) |

(52) U.S. Cl.
CPC .......... *B01J 20/0225* (2013.01); *B01J 20/04* (2013.01); *G01C 19/00* (2013.01); *G01C 19/64* (2013.01); *G01C 19/66* (2013.01); *G01C 19/661* (2013.01); *G01C 19/665* (2013.01)

(58) Field of Classification Search
CPC ....... B01J 20/0225; B01J 20/04; G01C 19/00; G01C 19/64; G01C 19/66; G01C 19/661; G01C 19/665
See application file for complete search history.

(56) References Cited

U.S. PATENT DOCUMENTS

| 4,670,691 A | * | 6/1987 | Podgorski | ............... | H01S 3/036 |
| | | | | | 313/558 |
| 4,740,985 A | * | 4/1988 | Podgorski | ............... | H01S 3/036 |
| | | | | | 313/562 |

(Continued)

FOREIGN PATENT DOCUMENTS

| CN | 111180294 A | 5/2020 |
| EP | 1859859 B1 | 3/2014 |

(Continued)

OTHER PUBLICATIONS

Espe, Werner—"Getter Materials" originally appeared in "Electronics" magazine in Oct. 1950, downloaded from http://www.thevalvepage.com/valvetek/getter/getter.htm on May 17, 2016, pp. 1 through 13.
European Patent Office, "Extended European Search Report", dated Feb. 9, 2024, from EP Application No. 23195993.3 from Foreign Counterpart to U.S. Appl. No. 17/935,878, pp. 1 through 11, Published: EP.
Herring, "Evaporation", Vac Aero International Inc., Sep. 7, 2015, pp. 1 through 5.

(Continued)

*Primary Examiner* — Jonathan M Hansen
(74) *Attorney, Agent, or Firm* — Fogg & Powers LLC (57) ABSTRACT

Systems and methods for oxide-based doping of an evaporable getter are described herein. In certain embodiments, a method includes mixing a first getter material with a second getter material to create a mixed getter material. The method also includes mixing an oxide dopant with the mixed getter material to create a doped getter material. Further, the method includes sealing the doped getter material within a device. Moreover, the method includes applying heat to the doped getter material to cause the doped getter material to emit a doped gas for deposition on internal surfaces of the device.

20 Claims, 4 Drawing Sheets

(56) References Cited

U.S. PATENT DOCUMENTS

| | | | |
|---|---|---|---|
| 5,056,102 A * | 10/1991 | Galbrecht | H01S 3/036 372/87 |
| 6,139,768 A | 10/2000 | Urso et al. | |
| 6,583,559 B1 | 6/2003 | Carretti et al. | |
| 6,873,102 B2 | 3/2005 | Martelli et al. | |
| 2003/0023484 A1 * | 1/2003 | Patel | H01S 3/038 313/558 |
| 2003/0107317 A1 | 6/2003 | Touchberry et al. | |
| 2004/0040941 A1 * | 3/2004 | Ecklund | G01C 19/661 219/121.63 |
| 2006/0051213 A1 * | 3/2006 | Touchberry | H01J 37/18 417/48 |
| 2011/0217491 A1 | 9/2011 | Chuntonov | |
| 2014/0248452 A1 * | 9/2014 | Toia | B01J 20/0222 252/181.4 |
| 2017/0297919 A1 | 10/2017 | Byun et al. | |
| 2018/0345215 A1 | 12/2018 | Ranish | |

FOREIGN PATENT DOCUMENTS

| | | |
|---|---|---|
| JP | 2003168365 A | 6/2003 |
| WO | 2000028568 A1 | 5/2000 |

OTHER PUBLICATIONS

Sezer et al., Metallography, "Metallothermic Production of Aluminum-Strontium Master Alloy for Modification of Silicon", Metallography, Microstructure, and Analysis, Nov. 16, 2020, Page(s) Cover through 840.

Wikipedia, "Ellingham diagram" as downloaded Feb. 12, 2024 from https://en.wikipedia.org/wiki/Ellingham_diagram#, pp. 1 through 3.

RCA Laboratories, "Vapor Pressure Data for the More Common Elements", Document RB-104, May 31, 1957, Page(s) Cover through 10.

* cited by examiner

OXIDE-BASED DOPING OF EVAPORABLE GETTER

BACKGROUND

Ring laser gyroscopes (RLGs) provide rotation measurement information by measuring propagation length differences between two counter-propagating lasers within a ring-shaped cavity. During RLG operation, a maintained atmosphere within the ring-shaped cavity facilitates laser generation and laser operation. However, over the lifetime of RLGs, high-voltage electronics that drive laser generation within the cavity also cause the generation of contaminating gases like oxygen and nitrogen. Frequently, RLGs use passive systems to remove the contaminating gases to maintain the desired operating atmosphere within the cavity. Examples of passive systems include evaporable getters, which are thin reactive metal films that absorb the contaminant gases in the atmosphere using processes like oxidation or nitridation.

SUMMARY

Systems and methods for oxide-based doping of an evaporable getter are described herein. In certain embodiments, a method includes mixing a first getter material with a second getter material to create a mixed getter material. The method also includes mixing an oxide dopant with the mixed getter material to create a doped getter material. Further, the method includes sealing the doped getter material within a device. Moreover, the method includes applying heat to the doped getter material to cause the doped getter material to emit a doped gas for deposition on internal surfaces of the device.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and methods described herein are drawn to oxide-based doping of evaporable getters. In certain embodiments, different getter materials are mixed together to create a mixed getter material. For example, the mixed getter material can be formed from nickel and barium aluminide powders. Additionally, an oxide dopant can be mixed with the getter material to create a doped getter material. For example, when the getter material contains barium aluminide, metal oxides that are reduced by aluminum can be added to the getter material as an oxide dopant to promote an aluminothermic reaction. When the doped getter material is mixed, the doped getter material may be pressed into a getter holder and sealed within a device. When the getter holder is sealed within the device, a device may apply heat to the getter holder, which causes the doped getter material to release gas that deposits on the interior surfaces of the device. The deposited material can then absorb contaminants from a sealed interior volume of the device.

As stated above, an evaporable getter is used to pump the contaminant gases through the oxidation or nitridation of a reactive metal film deposited on an internal surface of a volume. In some devices, rapid oxidation of the getter film may cause components inside the volume that are designed to operate with a minimal oxide layer to degrade. Thus, if the getter removes the contaminant gases too fast, the components may get damaged and may even burn out earlier in their operative lifetime. However, if the getter removes the gas too slowly, then the contaminant gases may interfere with the operation of the components. In these devices that are damaged by either a too fast or too slow absorption of contaminated gases, finding the proper chemistry of the getter extends the lifetime of a device.

In certain embodiments, getters are made from a combination of materials. For example, a getter can be made from a mixture of first and second getter materials, such as nickel and barium aluminide powders. However, the getter may be made from other combinations of powders as well. Further, the getter materials can be mixed together according to a desired ratio. The desired ratio may be a 1:1 ratio or other ratios of potential getter materials that facilitate the efficient consumption of the getter materials during getter activation.

In exemplary embodiments, to control the rate of activation and the speed with which a getter absorbs contaminant gases. A combination of metal oxides can be added as dopants to the mixed getter materials. When the getter material is barium aluminide, the metal oxides may be a combination of metal oxides that are reduced by aluminum in a chemical reaction (aluminum acts as the reducing agent or, otherwise stated, aluminum oxide is more stable than the oxide used as a dopant). For example, aluminum would act as a reducing agent for the oxides of titanium, strontium, niobium, and iron, among other metal oxides. Additionally, the reduced metal also has a high enough vapor pressure at flash temperatures for the barium aluminide to evaporate when the getter material is flashed such that the reduced metal deposits as part of the getter film.

In some embodiments, when making the doped getter materials, the getter material powders of nickel, barium aluminide, and the desired oxides (in small percentages) are mixed thoroughly and pressed into a getter holding device, like a getter pan. The getter holding device may be sealed within a volume of an encompassing device in a high vacuum. When the encompassing device is sealed, the doped getter material is heated to cause a reaction of the getter materials where the dopant oxides are reduced. The reaction releases a doped gas that condenses as a doped deposit on the interior surfaces of the encompassing devices. The deposited doped gas will pump contaminant gases from the atmosphere inside the encompassing device throughout the lifetime of the encompassing device.

In an exemplary implementation, where the getter material is a mixture of nickel and barium aluminide, a dopant of strontium oxide may be added to the getter material where the dopant is 2-6% of the doped getter material. The doped getter material can be pressed into a stainless-steel channel ring. The ring may be inserted in the encompassing device, which may be a gyroscope or other device. The device may be assembled within a vacuum, or the device may be assembled and gas inside the device may be evacuated from the interior of the device. An RF inductive heater may be applied to the external surface of the device. The RF inductive heater may heat the steel channel ring and the getter material to cause the barium aluminide to exothermically react with the nickel, which causes the getter material to reach temperatures up to 1200° C. for the release of barium gas. At the temperatures where the barium gas is released, the aluminum metal will reduce the strontium oxide, which causes the strontium to evaporate as strontium gas. The barium and strontium gases condense on the interior surface of the device as a metal film. After flashing, the vacuum within the device may be backfilled with a gas that supports the operation of the device. The deposited film may pump oxygen, nitrogen, and other contaminant gases that occur within the device through oxidation, nitridation, or other absorbing chemical reactions.

Figure 1:
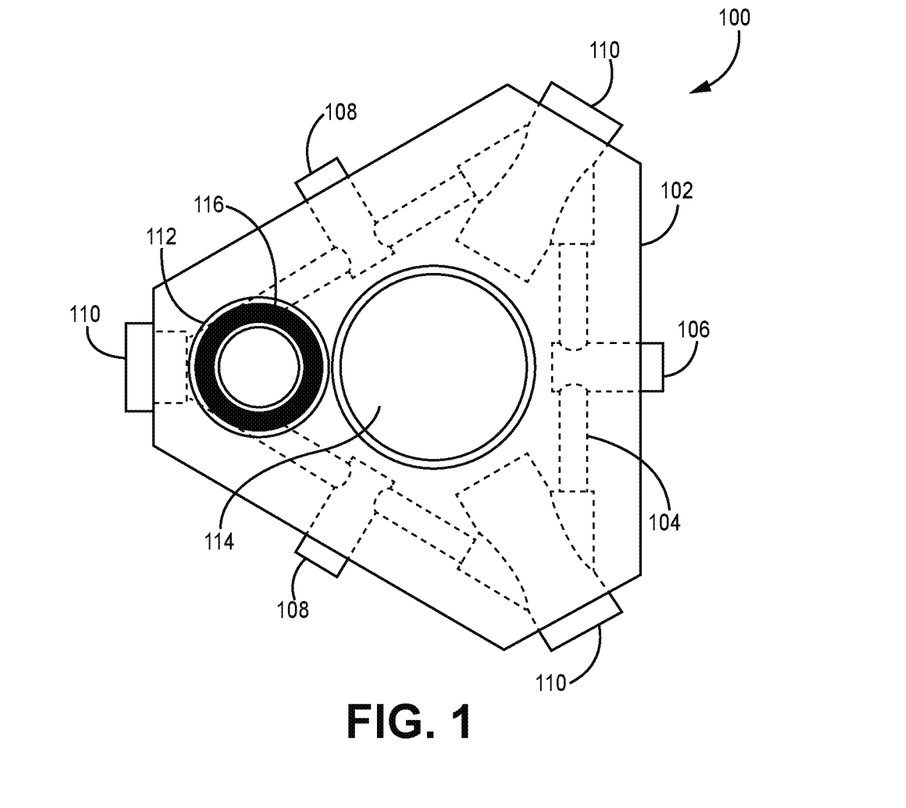
FIG. 1 is a diagram of an RLG having a getter according to an aspect of the present disclosure.

FIG. 1 shows a top view of an exemplary embodiment of an exemplary device that may use a getter to absorb contaminating gases. For example, the device may be a ring laser gyroscope (RLG) system 100. While the device is shown as being an RLG, the getter as described herein may be used in devices other than RLGs, such as atomic clocks, electron microscopes, e-beam lithography devices, vacuum tubes, metal vapor lamps, and the like. The RLG system 100 may include a housing 102, a cavity 104, one or more cathodes 106, one or more anodes 108, one or more mirrors 110, a getter cavity 112, and a mounting structure 114.

The getter cavity 112 may be located within the housing 102, adjacent to the cavity 104. The getter cavity 112 may be any enclosure in which a getter material may be placed prior to activation of the getter. After activation, the gas within the cavity 104 contacts the deposited getter film, where the deposited getter film may absorb contaminants from the gas within the cavity 104. The getter cavity 112 may be located at any location on the housing 102 that allows the contaminating gas to pass between the cavity 104 and an interior volume of the getter cavity 112. For example, the getter cavity 112 may be drilled through the top of a housing 102. Alternatively, the getter cavity 112 may be located in a gas discharge device mounted to a surface of the housing.

The RLG system 100 may produce rotation measurements by using counter-propagating laser beams directed to travel in a closed path (that is, a ring) to detect rotation about the axis of the path around which a laser beam is directed. The one or more mirrors 110 direct the laser beams about the closed path. For example, the one or more mirrors 110 may include three mirrors that direct the laser beam along a closed, triangular path, where each mirror is located at a corner of the triangular path.

To generate the laser beam, the one or more cathodes 106 and the one or more anodes 108 are electrodes that use electric fields to excite a gas mixture within the cavity 104 to generate light for forming a polarized laser beam. For example, the gas mixture within the cavity 104 may be a combination of helium and neon. To fill the cavity 104 with the desired gases, the cavity 104 may be sealed within a vacuum to evacuate potential contaminating gases from within the cavity 104. After being sealed and the getter activated, the cavity 104 is backfilled with the desired gases. However, after backfilling with the desired gases, the components of the RLG system 100 exposed to the cavity 104 may outgas or air from the environment outside the RLG system 100 may contaminate the gases within the cavity 104.

In certain embodiments, a getter holder 116 may be mounted within the getter cavity 112. The getter holder 116 may hold a getter material that can be activated for the deposition of a getter film, where the gas within the cavity 104 passes over the getter film. As the gas within the cavity 104 passes over the deposition getter film, the getter film absorbs the contaminating gases. For example, the getter film may absorb oxygen and nitrogen gases within the cavity 104. In some embodiments, the getter holder 116 may be a stainless-steel channel ring or getter pan that can be mounted within the getter cavity 112 using a snap ring, a spring, or other method for securing the getter holder 116 within the getter cavity 112.

In some embodiments, the getter material may be a mixture of a first getter material and a second getter material. The first getter material may be a first metal reactant, and the second getter material may be a compound of at least two parts. When sufficient heat is applied to the mixed getter material in a vacuum or sufficiently reduced pressure, a first part of the second getter material reacts with the first getter material in an exothermic reaction that causes the second part of the second getter material to turn into a vapor. For example, the first getter material may be nickel and the second getter material may be barium aluminide, and the first and second getter materials may be mixed at a 1:1 ratio, or the getter materials can be mixed at other possible ratios. However, the getter material may be a combination of other materials, such as titanium, zirconium, or other potential materials that have the same characteristics as described above.

In certain embodiments, when activating the getter material, a heater may be applied to an external surface of the RLG system 100. For example, the heater may be an RF induction heater that heats the getter material to sufficiently high temperatures within a sufficiently low pressure to activate a chemical reaction between the different components of the getter material. When the getter material is nickel and barium aluminide, the aluminide reacts with the nickel through an aluminothermic reaction that causes the barium to vaporize. After activation, the barium vapor condenses as a barium film on surfaces of the cavity 104, where the barium film can absorb contaminating gases within the cavity 104.

However, if the reaction of the getter material progresses too rapidly, the reaction may cause the rapid development of vapor, causing getter material to eject powder material within the cavity 104, potentially damaging components within the RLG system 100 such as the one or more anodes 108 and the one or more cathodes 106. Conversely, if the reaction of the getter material progresses too slowly, components of the RLG system 100 may break down because an insufficient amount of film was deposited. Thus, if the reaction goes too fast or too slow, the reaction of the getter material negatively affects the ability of the RLG system 100 to excite a laser within the cavity 104.

In certain embodiments, to adjust the speed of the reaction of the getter material, the getter material may be mixed with an oxide dopant. The oxide dopant slows down the reaction while contributing to the reaction. For example, when the getter film is generated through the reaction of barium aluminide and nickel with an oxide dopant present, the aluminide may help reduce the oxide dopant and stabilize the barium and also react with the nickel, which frees the barium for evaporation. Additionally, the quantity of the oxide dopant may slow down the aluminothermic reaction. Further, the use of oxides may also make the components of the RLG system 100 more handleable as they are less susceptible to degradation from oxygen or other gases.

Further, when mixing the oxide dopant with the getter material, the oxide dopant can be added at a proportion such that the components of the doped getter material are efficiently consumed during the activation reaction. The components of the doped getter material are efficiently consumed when substantially all of the reactants are changed into end products of the chemical reaction. For example, when the base getter materials are barium aluminide and nickel, a portion of the aluminide may react with the dopant oxide and the nickel while the barium and dopant metal vaporize for deposition within the cavity 104 or an adjoining cavity (such as the getter well or gas discharge tube) to the cavity 104 where the contaminating gas circulates between the adjoining cavity and the cavity 104. In some embodiments, the base getter materials may be selected to facilitate the reaction of the base getter materials with the doped getter materials. For example, when nickel is part of the base getter material, the nickel may be dendritic nickel.

In certain embodiments, the characteristics of the second getter material may determine the range of potential metal oxides that can be used as the dopant. As described above, the second getter material contains a first part that reacts with the first getter materials and a second part that is a metal that transitions to vapor during the reaction. The first part of the second getter material reduces the oxide dopant, and the metal of the oxide dopant has a sufficiently high vapor pressure when the doped getter material is flashed. For example, when the second getter material is barium aluminide, a usable oxide dopant is reduced by the aluminide, and the metal has a sufficiently high vapor pressure at the temperatures of the nickel-barium aluminide aluminothermic reaction.

Figure 2:
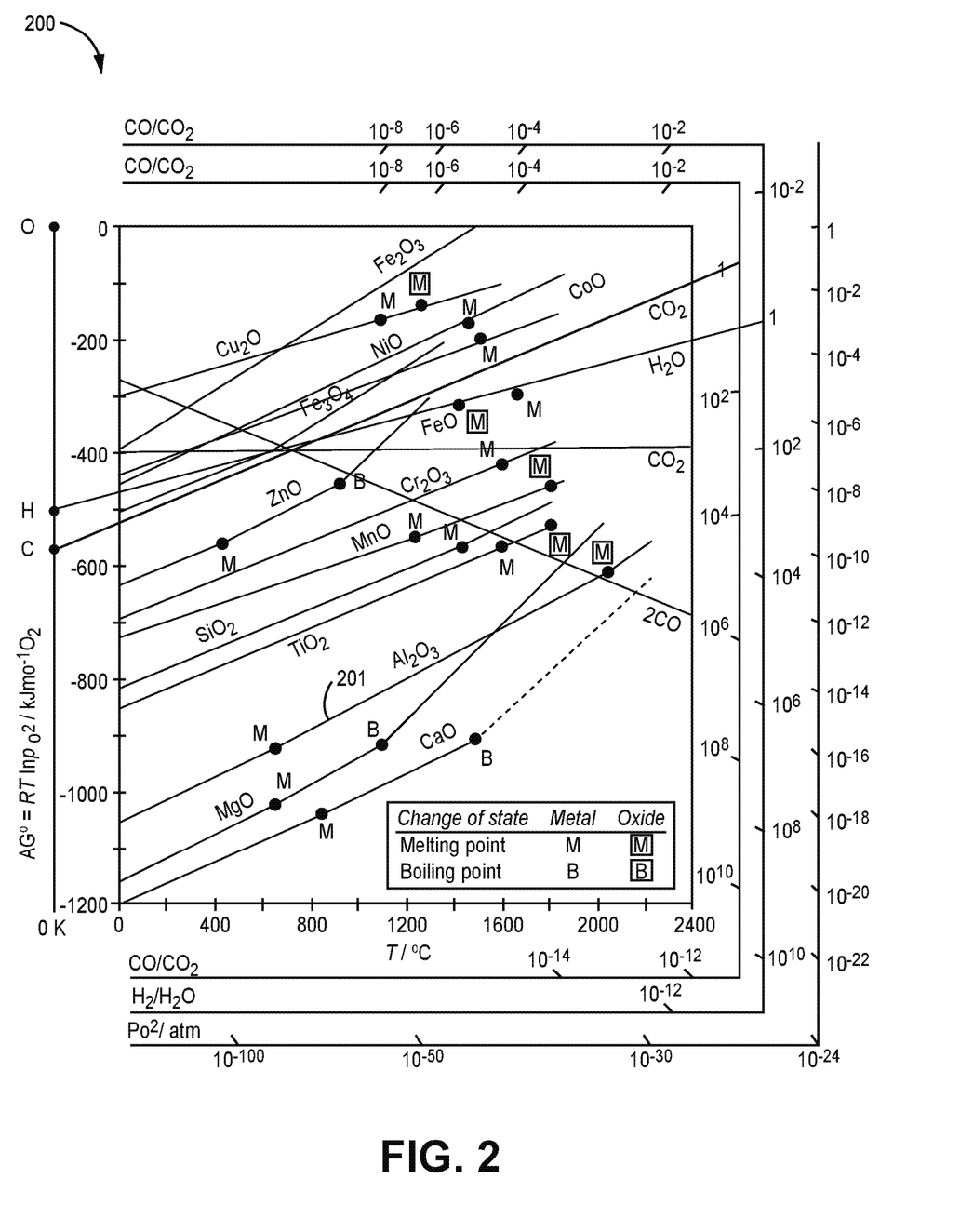
FIG. 2 illustrates an Ellingham diagram for various materials that provides information for selecting an oxide dopant according to an aspect of the present disclosure.

FIG. 2 is a graph 200 showing an Ellingham diagram that illustrates the stability of different metals and the oxides of the metals in different atmospheric situations relative to each other. The information shown in the graph 200 was acquired from https://en.wikipedia.org/wiki/Ellingham_diagram#/media/File:Ellingham_Richardson-diagram_english.svg.

The graph 200 illustrates the Gibbs free energy of formation for different metal oxides. When selecting the dopant metal oxide, one may first identify the oxide formed by the first part of the second getter material. After identifying the oxide formed by the first part of the second getter material, the potential oxide dopant may be a metal oxide having a lower stability than the identified oxide formed by the first part of the second getter material. As shown in the graph 200, oxides lower in the graph are more stable than oxides higher in the graph. Thus, oxides lower in the graph are preferentially formed. Thus, the oxide formed by the first part of the second getter material is preferentially formed in comparison to the dopant metal oxide, thus, the first part of the second getter material reduces the oxide dopant during getter activation.

In an exemplary embodiment, where the second getter material is barium aluminide, the first part of the second getter material is aluminide. During the getter activation, the aluminide forms aluminum oxide. The graph 200 shows the aluminum oxide energy of formation 201. Accordingly, the oxide dopant may potentially be a metal oxide higher in the graph 200 than the energy of formation 201 for the aluminum oxide which oxide dopants are reduced by aluminum. As shown, many metals are reduced by aluminum, however, magnesium and calcium are examples of metals that are not reducible by aluminum.

Additionally, a vacuum can shift the reaction of the oxide dopant with the second getter material so that the reaction can reduce the metal within the temperature range for the reaction. For example, when the second getter material is an aluminide, the reaction temperature range may be 600-1200° C. Additionally, when the dopant metal is strontium, the aluminum may reduce the strontium at pressures of $10^{-3}$ bar.

Figure 3:
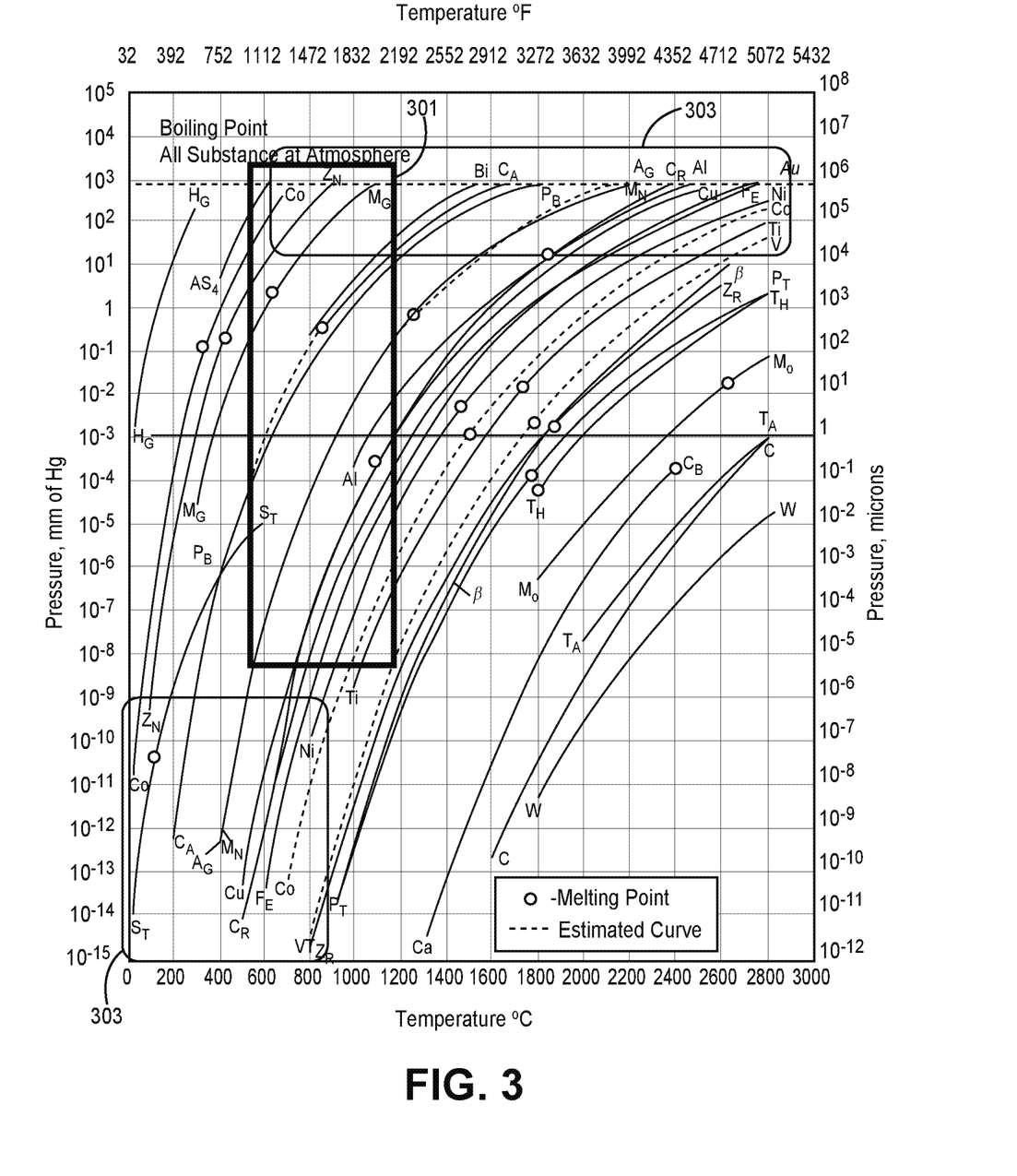
FIG. 3 illustrates vapor curves for various metals that provides information for selecting an oxide dopant according to an aspect of the present disclosure.

Additionally, the metal of the oxide dopant has a vapor pressure that is higher than the vacuum used during the activation of the getter. FIG. 3 is a graph 300 illustrating vapor pressure curves for multiple metals. The information shown in the graph 300 was acquired from https://vacaero.com/information-resources/the-heat-treat-doctor/1455-evaporation.html. As illustrated in the graph, a box 301 illustrates the metals having vapor pressures greater than a vacuum pressure during getter activation within the temperature range of getter activation. When the vapor pressure curve for a metal passes through ranges contained by the box 301, the metal may potentially be used as the metal in the dopant metal oxide. The boxes 303 encircle the element symbols of qualifying metals.

As disclosed above, a metal oxide can be used as an oxide dopant if the metal has a greater vapor pressure than the vacuum pressure during getter activation within the temperature range of getter activation and if the metal oxide is reduced by the second getter material. For example, when the second getter material is barium aluminide, iron oxide is an example of a potential dopant metal oxide. As shown in the graphs of FIGS. 2 and 3, iron oxide is reduced by the aluminide during the activation of the getter. Additionally, metallic iron has a high enough vapor pressure that the iron will evaporate in the vacuum used during the getter activation. Thus, iron oxide may function as a dopant metal oxide. Additionally, the oxide dopant may be a combination of different oxides that satisfy the conditions discussed above in relation to FIGS. 2 and 3. The greater amount of oxide dopant added in proportion to the first and second getter materials may slow down the speed of the getter activation reaction. Thus, the addition of the oxide dopant can be used to fine-tune the speed of the getter activation reaction to prevent the getter activation from damaging the device containing the getter.

Figure 4:
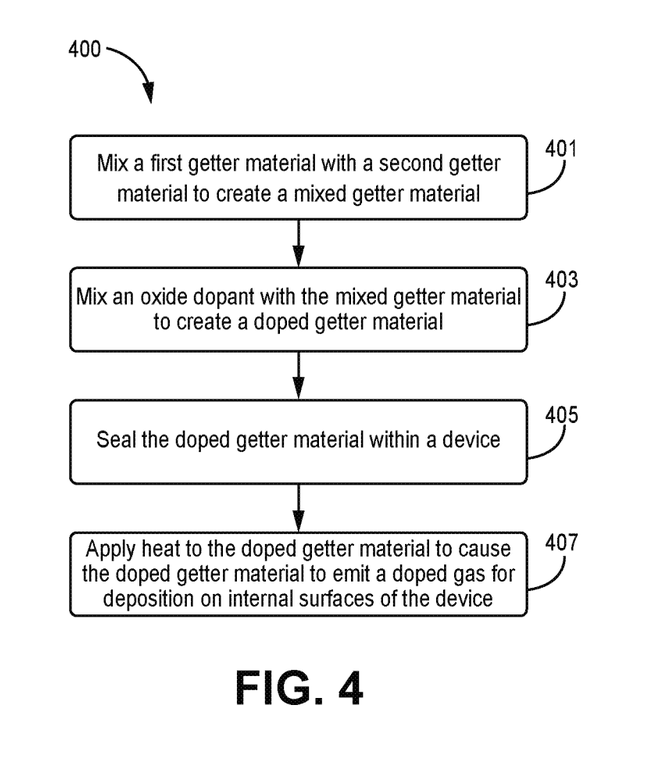
FIG. 4 is a flow chart diagram illustrating a method for using an oxide dopant within an evaporable getter according to an aspect of the present disclosure.

FIG. 4 depicts a flow diagram illustrating a method 400 for using an oxide dopant within an evaporable getter. The method 400 may be implemented via the techniques described in connection with FIGS. 1-3, but may be implemented using other techniques known to one having skill in the art. The blocks of the flow diagram have been arranged in a generally sequential manner to facilitate explanation. But, the arrangement of the blocks is merely exemplary, and the blocks can be arranged in any manner sufficient to provide the functionality described above with respect to FIGS. 1-3.

The method 400 proceeds at 401, where a first getter material with a second getter material is mixed to create a mixed getter material. For example, the first getter material may be nickel, and the second getter material may be barium aluminide. The nickel and the barium aluminide may be mixed together to form the mixed getter material. Further, the method 400 proceeds at 403, where an oxide dopant is mixed with the mixed getter material to create a doped getter material. For example, the oxide dopant may be a metal oxide that is mixed with the mixed getter material.

When the oxide dopant is mixed with the mixed getter material, the method 400 proceeds at 405, where the doped getter material is sealed within a device. For example, the device may be a ring laser gyroscope or other type of device that uses a getter to remove contaminating gases from a cavity inside the device. The doped getter material is sealed within the cavity of the device when the device is within a vacuum or other type of desired environment. Additionally, the method 400 proceeds at 407, where heat is applied to the doped getter material to cause the doped getter material to emit doped gas for deposition on internal surfaces of the device. For example, when the doped getter material is activated, both a metal of the oxide dopant and a metal of one of the first and second getter materials become a vapor that condenses on internal surfaces of the device as a film, where the film is able to absorb contaminating gases.

Example Embodiments

Example 1 includes a method comprising: mixing a first getter material with a second getter material to create a mixed getter material; mixing an oxide dopant with the mixed getter material to create a doped getter material; sealing the doped getter material within a device; and applying heat to the doped getter material to cause the doped getter material to emit a doped gas for deposition on internal surfaces of the device.

Example 2 includes the method of Example 1, wherein the oxide dopant is a metal oxide, and one of the first getter material and the second getter material acts as a reducing agent to the metal oxide.

Example 3 includes the method of Example 2, wherein sealing the doped getter material within the device comprises sealing the doped getter material within the device while in a vacuum.

Example 4 includes the method of Example 3, wherein the metal of the metal oxide has a vapor pressure greater than a pressure of the vacuum at a temperature range when the mixed getter material is activated.

Example 5 includes the method of any of Examples 1-4, wherein the first getter material is nickel and the second getter material is barium aluminide.

Example 6 includes the method of any of Examples 1-5, wherein the device is a ring laser gyroscope.

Example 7 includes the method of any of Examples 1-6, wherein the sealing of the doped getter material within the device comprises pressing the doped getter material into at least one of: a getter pan; and a channel ring.

Example 8 includes the method of any of Examples 1-7, wherein the oxide dopant has a plurality of metal oxides.

Example 9 includes the method of any of Examples 1-8 further comprising backfilling the device with desired gases.

Example 10 includes a device comprising: a housing; a cavity within the housing; a getter cavity adjacent to the cavity within the housing, wherein gas passes between the cavity and the getter cavity, and the cavity and the getter cavity are sealed within the housing from an external environment of the housing; and a getter holder located within the getter cavity configured to hold a doped getter material, wherein the doped getter material comprises a mixture of: a first getter material; a second getter material; and an oxide dopant.

Example 11 includes the device of Example 10, further comprising wherein a heater is applied to an external surface of the device to heat the doped getter material to an activation energy for flashing the doped getter material.

Example 12 includes the device of any of Examples 10-11, wherein the oxide dopant is a metal oxide, and one of the first getter material and the second getter material acts as a reducing agent to the metal oxide.

Example 13 includes the device of Example 12, wherein a metal of the metal oxide has a vapor pressure greater than a pressure of a vacuum at a temperature range associated with activation of a mixture of the first getter material and the second getter material.

Example 14 includes the device of any of Examples 10-13, wherein the first getter material is nickel and the second getter material is barium aluminide.

Example 15 includes the device of any of Examples 10-14, wherein the device is a ring laser gyroscope.

Example 16 includes the device of any of Examples 10-15, wherein the getter holder is at least one of: a getter pan; and a channel ring.

Example 17 includes the device of any of Examples 10-16, wherein the oxide dopant has a plurality of metal oxides.

Example 18 includes a ring laser gyroscope comprising: a housing; a cavity within the housing; a plurality of electrodes for generating counter-propagating lasers within the cavity; a plurality of mirrors mounted within the cavity to direct the counter-propagating lasers through the cavity; and a deposited getter film on an interior surface of the cavity that is a result of a chemical reaction of a doped getter material that comprises a mixture of: a first getter material; a second getter material; and an oxide dopant.

Example 19 includes the ring laser gyroscope of Example 18, wherein the oxide dopant is a metal oxide, and one of the first getter material and the second getter material acts as a reducing agent to the metal oxide.

Example 20 includes the ring laser gyroscope of Example 19, wherein a metal of the metal oxide has a vapor pressure greater than a pressure of a vacuum at a temperature range associated with activation of a mixture of the first getter material and the second getter material.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A method comprising:
   mixing a first getter material with a second getter material to create a mixed evaporable getter material;
   mixing an oxide dopant with the mixed getter material to create a doped evaporable getter material;
   sealing the doped evaporable getter material within a device; and
   applying heat to the doped evaporable getter material to cause the doped evaporable getter material to emit a doped gas for deposition on internal surfaces of the device.

2. The method of claim 1, wherein the oxide dopant is a metal oxide, and one of the first getter material and the second getter material acts as a reducing agent to the metal oxide.

3. The method of claim 2, wherein sealing the doped evaporable getter material within the device comprises sealing the doped evaporable getter material within the device while in a vacuum.

4. The method of claim 3, wherein the metal of the metal oxide has a vapor pressure greater than a pressure of the vacuum at a temperature range when the mixed evaporable getter material is activated.

5. The method of claim 1, wherein the first getter material is nickel and the second getter material is barium aluminide.

6. The method of claim 1, wherein the device is a ring laser gyroscope.

7. The method of claim 1, wherein the sealing of the doped evaporable getter material within the device comprises pressing the doped evaporable getter material into at least one of:
   a getter pan; and
   a channel ring.

8. The method of claim 1, wherein the oxide dopant has a plurality of metal oxides.

9. The method of claim 1 further comprising backfilling the device with desired gases.

10. A device comprising:
    a housing;
    a cavity within the housing;
    a getter cavity adjacent to the cavity within the housing, wherein gas passes between the cavity and the getter cavity, and the cavity and the getter cavity are sealed within the housing from an external environment of the housing; and
    a getter holder located within the getter cavity configured to hold a doped evaporable getter material, wherein the doped evaporable getter material comprises a mixture of:
      a first getter material;
      a second getter material; and
      an oxide dopant.

11. The device of claim 10, further comprising wherein a heater is applied to an external surface of the device to heat the doped evaporable getter material to an activation energy for flashing the doped evaporable getter material.

12. The device of claim 10, wherein the oxide dopant is a metal oxide, and one of the first getter material and the second getter material acts as a reducing agent to the metal oxide.

13. The device of claim 12, wherein a metal of the metal oxide has a vapor pressure greater than a pressure of a vacuum at a temperature range associated with activation of a mixture of the first getter material and the second getter material.

14. The device of claim 10, wherein the first getter material is nickel and the second getter material is barium aluminide.

15. The device of claim 10, wherein the device is a ring laser gyroscope.

16. The device of claim 10, wherein the getter holder is at least one of:
    a getter pan; and
    a channel ring.

17. The device of claim 10, wherein the oxide dopant has a plurality of metal oxides.

18. A ring laser gyroscope comprising:
    a housing;
    a cavity within the housing;
    a plurality of electrodes for generating counter-propagating lasers within the cavity;
    a plurality of mirrors mounted within the cavity to direct the counter-propagating lasers through the cavity; and
    a deposited getter film on an interior surface of the cavity that is a result of a chemical reaction of a doped evaporable getter material that comprises a mixture of:
      a first getter material;
      a second getter material; and
      an oxide dopant.

19. The ring laser gyroscope of claim 18, wherein the oxide dopant is a metal oxide, and one of the first getter material and the second getter material acts as a reducing agent to the metal oxide.

20. The ring laser gyroscope of claim 19, wherein a metal of the metal oxide has a vapor pressure greater than a pressure of a vacuum at a temperature range associated with activation of a mixture of the first getter material and the second getter material.

\* \* \* \* \*